(12) United States Patent
Luu et al.

(10) Patent No.: US 8,428,562 B2
(45) Date of Patent: Apr. 23, 2013

(54) SYSTEMS AND METHODS FOR RETRIEVING VOICEMAIL ACCOUNT INFORMATION

(75) Inventors: Adrianne Luu, Roswell, GA (US); Mark Causey, Tucker, GA (US); Michael Zubas, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 701 days.

(21) Appl. No.: 12/621,662

(22) Filed: Nov. 19, 2009

(65) Prior Publication Data

US 2011/0117882 A1     May 19, 2011

(51) Int. Cl.
*H04M 11/10*     (2006.01)
(52) U.S. Cl.
USPC ............... 455/413; 455/414.1; 455/414.4; 455/428
(58) Field of Classification Search ............ 455/413, 455/414.1–414.4, 420, 428, 435.1, 403; 370/259, 370/310; 379/93.24, 100.08
See application file for complete search history.

(56) References Cited

U.S. PATENT DOCUMENTS

2004/0235467 A1* 11/2004 Tuilier ................ 455/422.1
2006/0294208 A1* 12/2006 Adams et al. ............ 709/220

* cited by examiner

*Primary Examiner* — Kamran Afshar
*Assistant Examiner* — Marisol Fahnert
(74) *Attorney, Agent, or Firm* — Parks IP Law LLC; Mickkl D. Murray Esq.

(57) ABSTRACT

A provisioning system configured to retrieve a voicemail password and/or a pilot number for a voicemail account, create a first service request directed to an over-the-air system, and send the first service request to the over-the-air system, if the provisioning system determines that the voicemail account has been initialized. The first service request instructs the over-the-air system to format a first message including the voicemail password and/or the pilot number for delivery to a mobile device. The provisioning system is further configured to create a second service request directed to the over-the-air system and send the second service request to the over-the-air system, if the provisioning system determines that the voicemail account has not been initialized. The second service request instructs the over-the-air system to format a second message including a default voicemail password and/or a default pilot number for delivery to the mobile device.

20 Claims, 3 Drawing Sheets

SYSTEMS AND METHODS FOR RETRIEVING VOICEMAIL ACCOUNT INFORMATION

TECHNICAL FIELD

The present disclosure relates generally to voicemail and, more particularly, to systems and methods for retrieving voicemail account information.

BACKGROUND

Voicemail systems allow a calling party to leave a voicemail message for a called party if the called party is unavailable to answer an incoming call. Typically, a calling party places a call to a desired called party using a landline or wireless telephone and, after a predetermined number of unanswered rings, the host network routes the call to a voicemail system that includes a voicemail box for the called party. The voicemail system plays a default or custom greeting that prompts the calling party to leave a voicemail message. The voicemail message is recorded and stored in association with the called party's voicemail box for later retrieval by the called party.

Traditional voicemail systems (referred to herein as plain-old voicemail or POVM) allow users to retrieve messages stored in his or her voicemail box using a telephone user interface (TUI). Users are able to listen to messages, skip messages, delete messages, and save messages using the TUI. TUIs also provide functions for users to set a voicemail greeting, record a voicemail greeting, record a name, and set/change a voicemail password.

In order for a user to hear a voicemail message that is not the only or first new message in the voicemail box, POVM users must listen to, skip, delete, or save each voicemail message while reviewing their voicemail box. This is time consuming and can be frustrating for the user in situations where an important voicemail message has been deposited.

Various voicemail systems have been developed to help reduce the need to search through multiple voicemail messages to retrieve a particular voicemail message. One such system is configured to prioritize voicemail messages based upon a priority scheme. The priority scheme includes a plurality of priority levels that can be assigned to various telephone numbers, such as those stored in a user's contact list. The system uses a calling party's telephone number to set a priority for a voicemail message left by the called party, and to position the voicemail message in the called party's voicemail box in an order prescribed by the priority scheme. When the called party accesses the voicemail system to acquire voicemail messages, he or she is presented with each voicemail message in the prescribed order. This reduces the need to listen to or skip through multiple voicemail messages to find an important message. In some instances, however, an important message may be assigned a position of low importance, for example, if the called party has not set a priority for the particular calling party. In this system, the priority for an incoming voicemail message is determined directly by the telephone number associated with the calling party.

Other systems allow a called party to access voicemail messages directly from their mobile device without having to call a voicemail system. Such systems are commonly referred to as visual voicemail (VVM) systems. In these systems, a calling party leaves a voicemail message in a typical manner as described above. The VVM system then sends the voicemail message in an appropriate audio file format to the called party's mobile device for storage and retrieval. Alternatively, the VVM system sends header information including, for example, the calling party, length of the voicemail message, the date and time the voicemail message was recorded, and any necessary details regarding the host VVM system that the mobile device needs to retrieve the voicemail message. When the called party selects the voicemail message from the mobile device, the mobile device uses the header information to contact the VVM system and request the voicemail audio content associated with the voicemail message. The VVM system sends the voicemail audio content in an appropriate audio file format to the mobile device. The mobile device may alternatively stream the voicemail audio content.

Voicemail systems have security mechanisms, such as passwords, in place to prevent unauthorized access to voicemail messages. Some voicemail systems allow remote access from landlines or wireless devices with the proper password, and other voicemail systems require access from the device associated with the requested voicemail box. Passwords are provided manually by the user upon each access or supplied by the user's device when the user dials the voicemail system number.

A user may forget their password, lose their device, purchase a new device, upgrade/downgrade their service, or otherwise make a change to their account that affects their ability to access their voicemail box. Most often, the user calls customer service to retrieve the information (e.g., voicemail password and voicemail number) necessary to regain access to their voicemail box. In other situations, a voicemail service provider may make changes that affect a user's ability to access their voicemail box.

SUMMARY

According to one aspect of the present disclosure, a system includes a provisioning system configured to determine whether a voicemail account has been initialized for a subscriber. If it is determined that the voicemail account has been initialized for the subscriber, the provisioning system retrieves voicemail account information including a voicemail password and a pilot number and creates a first service request directed to an over-the-air system. The first service request instructs the over-the-air system to format a first message including the voicemail password and the pilot number for delivery to the mobile device via a message service center. The provisioning system is further configured to send the first service request to the over-the-air system.

If, however, the provisioning system determines that the voicemail account has not been initialized for the subscriber, the provisioning system creates a second service request directed to the over-the-air system. The second service request instructs the over-the-air system to format a second message including a default voicemail password and a default pilot number for delivery to the mobile device via the message service center. The provisioning system is further configured to send the second service request to the over-the-air system.

In some embodiments, the over-the-air system is configured to receive the first service request or the second service request from the provisioning system, format the first service request or the second service request as the first message or the second message, respectively, and send the first message or the second message to the message service center for delivery to the mobile device.

In some embodiments, the message service center is configured to receive the first message or the second message from the over-the-air system, store the first message or the second message received from the over-the-air system, and send the first message or the second message to the mobile device.

In some embodiments, the provisioning system is configured to detect that the voicemail account has been moved from a first voicemail system to a second voicemail system, thereby triggering the provisioning system to determine whether the voicemail account has been initialized. If the provisioning system determines that the voicemail account has been initialized, the provisioning system retrieves the voicemail account information, including the voicemail password and the pilot number, from the second voicemail system. If, however, the provisioning system determines that the voicemail account has not been initialized, the provisioning system creates the second service request directed to the over-the-air system. The second service request instructs the over-the-air system to format the second message including the default voicemail password and the default pilot number. The default voicemail password and the default pilot number are assigned by the second voicemail system.

In some embodiments, the provisioning system is configured to detect that the voicemail account has been moved within a voicemail system, thereby triggering the provisioning system to determine whether the voicemail account has been initialized. If the provisioning system determines that the voicemail account has been initialized, the provisioning system retrieves the voicemail account information including the voicemail password and the pilot number from the voicemail system. If, however, the provisioning system determines that the voicemail account has not been initialized, the provisioning system creates the second service request directed to the over-the-air system. The second service request instructs the over-the-air system to format the second message, including the default voicemail password and the default pilot number. The default voicemail password and the default pilot number are assigned by the voicemail system.

According to some embodiments, the provisioning system is configured to detect that a new mobile device, that was not previously associated with the voicemail account, has requested initialization of the voicemail account from a voicemail system, thereby triggering the provisioning system to determine whether the voicemail account has been initialized for the new mobile device. If the provisioning system determines that the voicemail account has been initialized for the new mobile device, the provisioning system retrieves the voicemail account information, including the voicemail password and the pilot number from the voicemail system. If, however, the provisioning system determines that the voicemail account has not been initialized for the new mobile device, the provisioning system creates the second service request directed to the over-the-air system. The second service request instructs the over-the-air system to format the second message, including the default voicemail password and the default pilot number. The default voicemail password and the default pilot number are assigned by the voicemail system.

In some embodiments, the provisioning system is configured to receive a request for the voicemail password from the mobile device, thereby triggering the provisioning system to determine whether the voicemail account has been initialized. If the provisioning system determines that the voicemail account has been initialized, the provisioning system retrieves the voicemail account information, including the voicemail password and the pilot number, from a voicemail system serving the voicemail account. If, however, the provisioning system determines that the voicemail account has not been initialized for the new mobile device, the provisioning system creates the second service request directed to the over-the-air system. The second service request instructs the over-the-air system to format the second message including the default voicemail password and the default pilot number. The default voicemail password and the default pilot number are assigned by the voicemail system.

In some embodiments, the provisioning system is configured to determine whether the voicemail account has been initialized for the subscriber, in response to a voicemail system update that causes one of the pilot number and the voicemail password associated with the voicemail account to be changed.

According to another aspect of the present disclosure, a method for providing voicemail account information to a mobile device operating in a wireless telecommunications network includes providing a provisioning system for determining whether a voicemail account has been initialized for a subscriber. If the voicemail account has been initialized for the subscriber, a voicemail password is retrieved and a first service request directed to an over-the-air system is created. The first service request instructs the over-the-air system to format a first message including the voicemail password for delivery to the mobile device via a message service center. The method also includes sending the first service request to the over-the-air system.

If, however, the voicemail account has not been initialized for the subscriber, a second service request directed to the over-the-air system is created. The second service request instructs the over-the-air system to format a second message including a default voicemail password for delivery to the mobile device via the message service center. The method also includes sending the second service request to the over-the-air system.

According to another aspect of the present disclosure, a method includes providing a provisioning system for retrieving the voicemail account information, including a voicemail password and a pilot number, in response to a change occurring to a voicemail account and/or the mobile device that causes the voicemail password and/or the pilot number to change. The method further includes instructing an over-the-air system to send a message, including the voicemail password and/or the pilot number, based upon the change. The method also includes the over-the-air system creating the message, including the voicemail password and/or the pilot number, based upon the change and sending the message to a message service center. The method also includes the message service center receiving the message from the over-the-air system and delivering the message to the mobile device.

DETAILED DESCRIPTION

Figure 1:
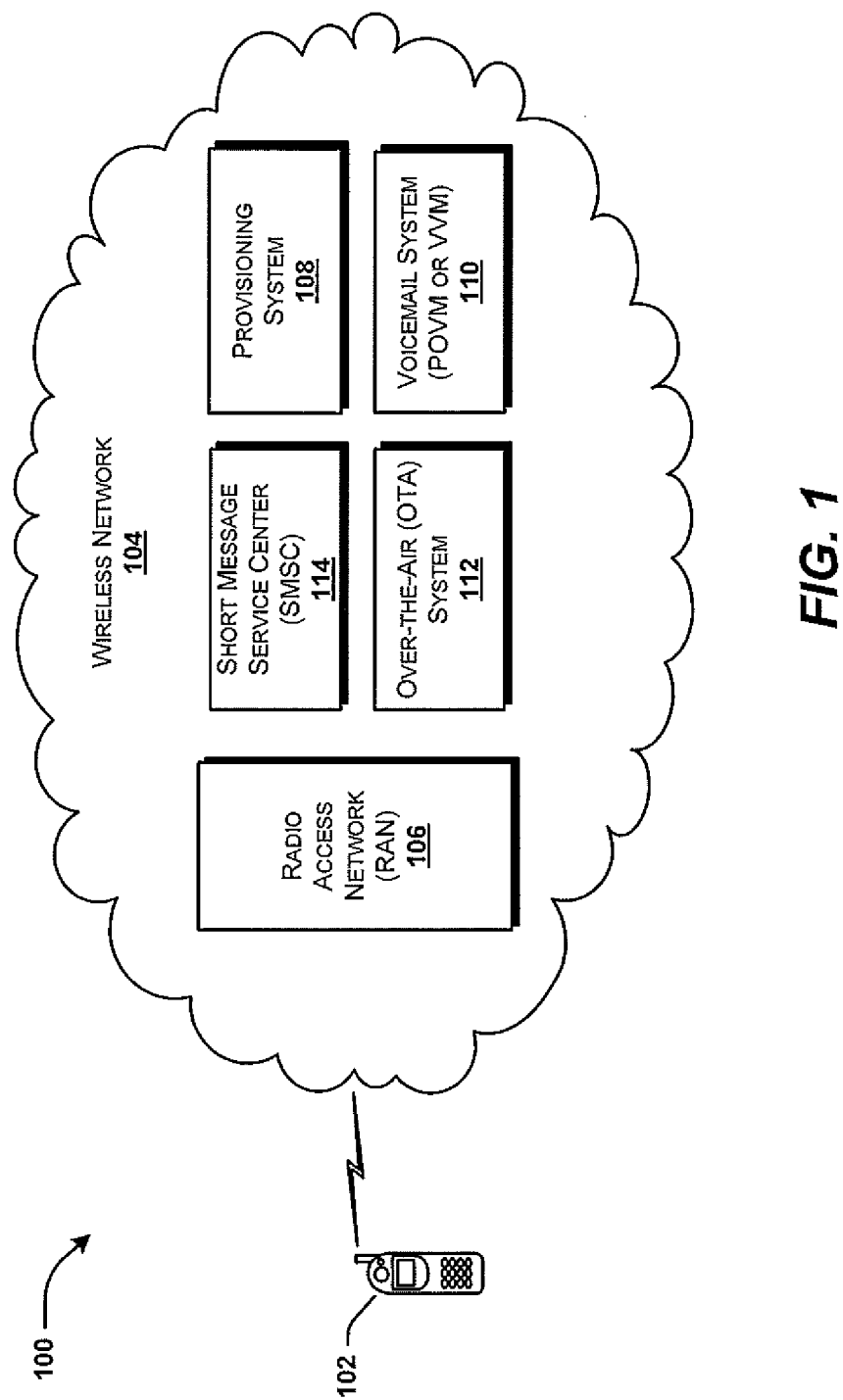
FIG. 1 illustrates an exemplary wireless communications network system.

As required, detailed embodiments of the present disclosure are provided herein. The disclosed embodiments are merely examples that may be embodied in various and alternative forms, and combinations thereof. As used herein, for example, exemplary, and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the devices and methods of the present disclosure. Therefore, specific structural and functional details disclosed herein are not to be interpreted as limiting, but merely as a basis for the claims and as a representative basis for teaching one skilled in the art to variously employ the present disclosure.

The systems and methods of the present disclosure may be implemented in wireless networks that use exemplary telecommunications standards, such as Global System for Mobile communications (GSM) and a Universal Mobile Telecommunications System (UMTS). It should be understood, however, that the systems and methods may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G, 3G, and above (e.g., 4G and beyond) technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data bearers.

While the methods described herein may, at times, be described in a general context of computer-executable instructions, the methods of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

The systems and methods provided herein function in response to various stimuli. For example, a user may forget their voicemail password and call customer service to retrieve it. A customer service representative may require the user to provide identification information, such as name, physical address, telephone number, alternate telephone number, account number, social security number, security question answer, service account password (if different from voicemail password), email address, combinations thereof, or the like, in order to retrieve their voicemail password. In some cases, the customer service representative may require the user to change their voicemail password to provide further security for the user's account as per procedure or if fraudulent activity is suspected.

The systems and methods disclosed below provide a secure method for the user to retrieve their voicemail password in the event he or she forgets, misplaces, or otherwise no longer has access to their voicemail password. The user may receive their voicemail password or the voicemail password may be automatically provided to the user's mobile device depending upon the scenario.

Another scenario in which a user may need to retrieve their voicemail password is if the user changes devices. Users may be provided with device upgrade offers, desire to upgrade to a new device, or need a new device to replace a lost, stolen, or broken device. Some devices allow a user to set the voicemail password or enter the voicemail password once permitting future access to their voicemail box from that device. In any case, if a user changes devices without first writing down or remembering their voicemail password, the user must call customer service to retrieve or change their voicemail password prior to accessing their voicemail box from their new device.

In other scenarios, the pilot number associated with the user's voicemail system may be changed. For example, some voicemail systems are associated with multiple pilot numbers, each being used to access a different set of voicemail boxes residing in the voicemail system. In certain instances, the user's voicemail box may be moved within a voicemail system and become associated with a different pilot number. In this case, the user may have an interruption in service if they are not promptly notified of the change. The systems and methods provided herein may provide a new pilot number to the user's device so as to prevent any interruption of service and resulting frustration felt by the user. The pilot number may be changed for other reasons, such as the user's voicemail box being moved to a new voicemail system.

Referring now to FIG. 1, an exemplary wireless communications network system 100 is illustrated. The wireless communications network system 100 provides a suitable environment in which the disclosed methods are implemented. As illustrated, the system 100 includes a mobile device 102, such as a cellular telephone, wireless messaging device, computer of any form factor (e.g., laptop, notebook, netbook, subnotebook, etc.), or the like. The mobile device 102 is compatible with a voicemail service, such as plain-old voicemail (POVM) and visual voicemail (VVM) services. As a computer, the mobile device 102 may be configured with a fixed or removable network access card. In this embodiment, the computer may also be configured with voicemail software to support POVM and/or VVM services.

The illustrated mobile device 102 is in communication with a wireless network 104. As described above, the wireless network 104 may operate according to GSM and UMTS standards or other suitable telecommunications technologies. The illustrated wireless network 104 includes a radio access network (RAN) 106. The RAN 106 includes base transceiver station(s) (BTS), commonly referred to as cell towers. A BTS provides the air/radio interface by which a mobile device communicates wirelessly with the wireless network 104. Each BTS is in communication with a base station controller (BSC) (not shown). A BSC allocates radio resources to the mobile device, administers frequencies, and controls handovers between BTSs. A BSC communicates with a circuit-switched core network and packet-switched core network via a mobile switching center (MSC) and serving GPRS support node (SGSN), respectively (components not shown). MSC, SGSN and other network elements of the core networks are not illustrated so as not to distract from the various aspects of the present disclosure.

The wireless network 104 also includes a provisioning system 108, a voicemail system 110, an over-the-air (OTA) system 112, and a short message service (SMS) center (SMSC) 114. The functions of these network elements are described in greater detail. It should be understood that, in some embodiments, functions described below as being performed by one network element may alternatively be performed by another network element. In one embodiment, the provisioning system 108 or the functions thereof are combined with the voicemail system 110 or vice versa. In another embodiment, the OTA system 112 and provisioning system 108 are combined. In other embodiments, the OTA system 112 and SMSC 114 are combined. Other combinations of the illustrated network elements that would be logical to improve performance, reduce costs, or facilitate easier maintenance are contemplated.

The provisioning system 108 is a combination of hardware and/or software responsible for provisioning voicemail access. In some embodiments, the provisioning system 108 provides provisioning functions to the wireless network 104 for POVM and/or VVM services. In some embodiments, the provisioning system 108 is part of a voicemail platform including the voicemail system 110 or is otherwise in communication with the voicemail system 110 to retrieve voicemail account information, such as voicemail password and pilot number. In some embodiments, the provisioning system 108 is a component of the voicemail system 110. Alternatively, the provisioning system 108 is an independent network element as shown. In some embodiments, the provisioning system 108 maintains records regarding whether voicemail service has been provisioned for a given subscriber and whether the subscriber's voicemail account has been initialized. A voicemail account is typically initialized after the subscriber completes a setup process. Voicemail initialization is a process of activating a new voicemail box. The process typically provides an option for changing a temporary/initial password to a personal password, recording a name, setting a default greeting or recording a custom greeting, and otherwise setting up and configuring the new voicemail box.

In some embodiments, the provisioning system 108 maintains voicemail class of service (CoS) records or communicates with other network elements, such as subscriber databases (e.g., home location register, home subscriber server) to retrieve this information for provisioning purposes.

The provisioning system 108 is configured to determine whether a voicemail account has been initialized for a subscriber, for example, by accessing internal records in the provisioning system 108 to determine whether the subscriber has an initialized voicemail account, or by communicating with the voicemail system 110 to retrieve this information. For voicemail accounts that have been initialized, the provisioning system is configured to retrieve voicemail account information, such as a voicemail password and/or pilot number, for the voicemail account and create a service request based upon the voicemail account information. The service request is directed to the OTA system 112 with instructions to create an SMS message directed to the mobile device 102. The provisioning system 108 is also configured to send the service request to the OTA system 112.

For voicemail accounts that have not been initialized, the provisioning system 108 is configured to create an alternative service request directed to the OTA system 112. The alternative service request includes instructions to the OTA system 112 to create an SMS message directed to the mobile device 102. The message includes a default voicemail password and/or a default pilot number for delivery to the mobile device 102. The provisioning system 108 is also configured to send the alternative service request to the OTA system 112.

The voicemail system 110 is in communication with the provisioning system 108 to provide voicemail account information to the provisioning system 108 upon request. In some embodiments, the voicemail system 110 is a combination of hardware and software. In some embodiments, the voicemail system 110 includes a telephony server for handling incoming voicemail inquiries via a telephone user interface (TUI) and a storage server for storing and managing voicemail messages for a plurality of voicemail accounts. In some embodiments, the voicemail system 110 is configured to store a plurality of voicemail accounts. Each voicemail account includes one or more voicemail boxes in which voicemail messages are deposited for a subscriber. The number of voicemail messages capable of being stored per account may be determined by the voicemail service provider or a third party provider, such as the voicemail system manufacturer, for example. The maximum voicemail message length may also be set.

In some embodiments, the voicemail system 110 is accessible via a TUI as is typical for POVM access. In other embodiments, the voicemail system 110 is accessible via the mobile device 102, for example, if the mobile device 102 is configured to support VVM, such as by including a VVM application on the mobile device 102. The voicemail system 110 maintains message states for each voicemail message. Message states include, but are not limited to, an unheard—new state, a skipped state, and a saved—read state. Messages may be deleted from the voicemail system 110, for example, via the TUI for POVM setups or via the VVM application on the mobile device 102 for VVM setups.

The OTA system 112 is in communication with the provisioning system 108. The OTA system 112 receives service requests from the provisioning system 108, formats a service request into a message compatible with the mobile device 102, and sends the message to a message service center, such as the SMSC 114, for delivery to the mobile device 102.

The SMSC 114 is a combination of hardware and software, and is responsible for receiving and storing messages received from the OTA system 112 and delivering the messages to the mobile device 102 in accordance with SMS standard protocols.

The voicemail password, included in the message sent by the SMSC 114, may be presented to a user of the mobile device 102 on a display, for example. The user may then use the voicemail password to access a voicemail box associated with their voicemail account. Alternatively, the voicemail password may be stored by the mobile device 102 such that the mobile device 102 provides the voicemail password to the voicemail system 110 when the user attempts to access his or her voicemail box.

The pilot number included in the message may be presented to a user of the mobile device 102 on a display, for example. The user may then use the pilot number to access the appropriate voicemail system, such as the illustrated voicemail system 110. Alternatively, the pilot number may be stored in a memory of the mobile device 102 association with a hot key or speed dial function on the mobile device 102 so as to provide the user with quick access to their voicemail box.

Figure 2:
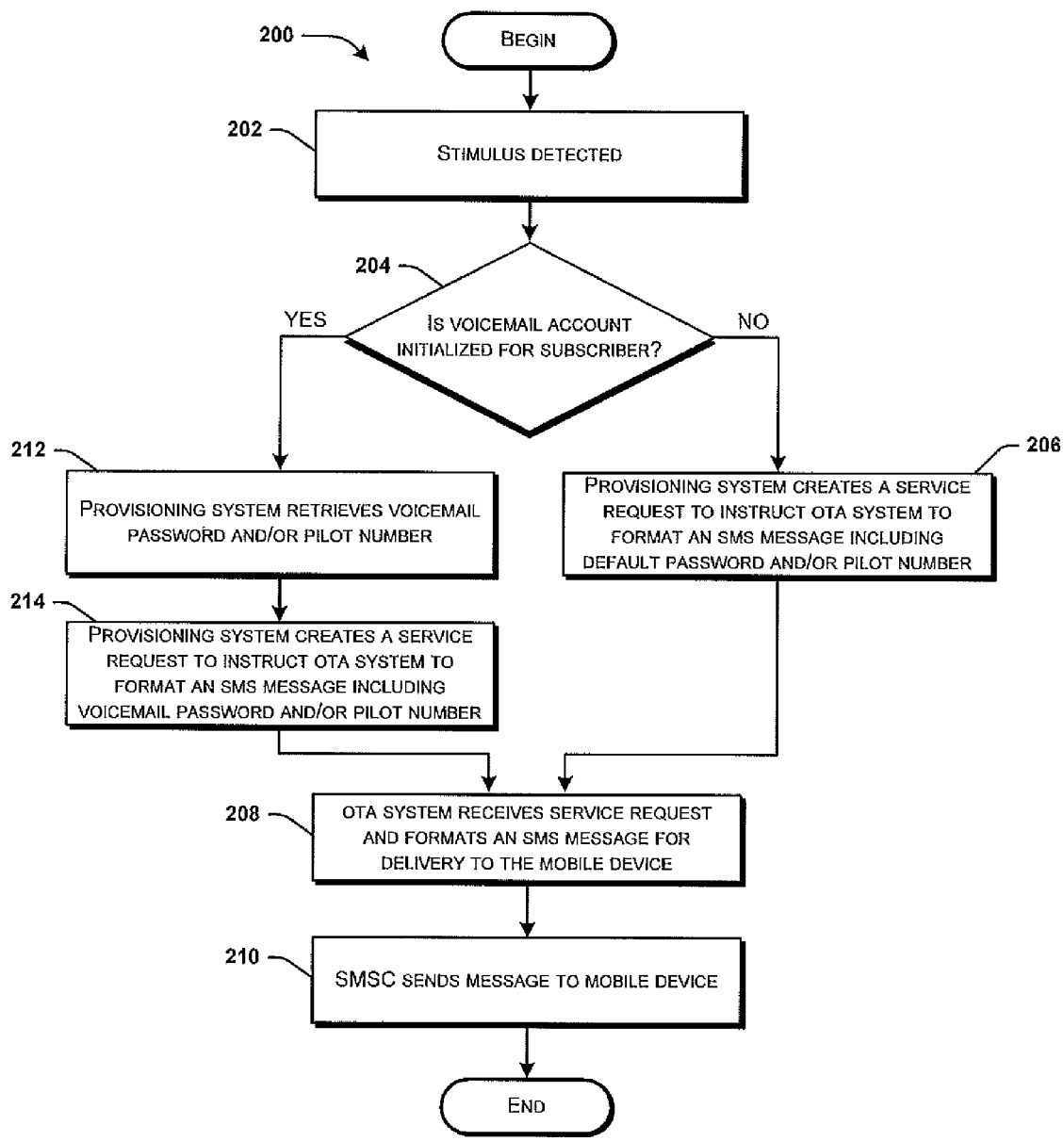
FIG. 2 illustrates an exemplary method for providing voicemail account information to a mobile device.

Referring now to FIG. 2, a method 200 for providing voicemail account information to a mobile device is shown. It should be understood that the steps of the method 200 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 200 can be ended at any time. In certain embodiments, some or all steps of this process, and/or substantially equivalent steps are performed by execution, by a processor, of computer-readable instructions stored or included on a computer-readable medium of one or more of the provisioning system 108, the voicemail system 110, the over-the-air system 112, and the SMSC 114.

The method 200 begins and flow proceeds to block 202, whereat a stimulus triggers the remaining steps of the method 200. Generally, the stimulus is one or more circumstances causing a situation in which a subscriber/mobile device does not have voicemail access. Some exemplary stimuli are now described.

In some embodiments, the stimulus is an update to the voicemail system 110 that causes a pilot number of the voicemail system 110 and/or a voicemail password associated with a voicemail account to be changed. Updates may include software updates, maintenance updates, hardware updates, combinations thereof, or the like.

In other embodiments, the stimulus is when the mobile device 102 creates a request for voicemail account information including the voicemail password and/or pilot number for the voicemail system 110. This may be done automatically by an application (e.g., a visual voicemail application) stored on the mobile device 102 or upon user request. In yet other embodiments, the stimulus is a device change. In still other embodiments, the stimulus is a change in the storage location of the voicemail account and associated voicemail box. For example, the voicemail account may be moved from one voicemail system to another or be moved within a voicemail system to a portion served by a different pilot number.

In response to the stimulus at block 202, the method 200 proceeds to block 204, whereat a determination is made as to whether the voicemail account is initialized for the subscriber. Here, it is assumed that because the subscriber at one time or another had access to a voicemail account, the voicemail account has been provisioned by the appropriate systems, but for one reason or another the voicemail account may not be initialized; for example, if the subscriber has changed devices, the voicemail account has changed storage locations, fraudulent activity has caused the voicemail account to revert to a provisioned—not initialized state, or the like.

If, at block 204, it is determined that the voicemail account is in the provisioned/not initialized state, flow proceeds to block 206, whereat the provisioning system 108 creates a service request to instruct the OTA system 112 to format an SMS message including a default voicemail password and/or a default pilot number. The provisioning system 108 then delivers the service request to the OTA system 112.

At block 208, the OTA system 112 receives the service request and formats the service request into an SMS message including the default voicemail password and/or the default pilot number. The OTA system 112 then sends the SMS message to the SMSC 114 for delivery to the mobile device 102. At block 210, the SMSC 114 receives the SMS message and forwards the message to the mobile device 102 in accordance with SMS standard protocols. The method 200 ends.

If, at block 204, it is determined that the voicemail account is initialized for the subscriber (i.e., the voicemail account is in a provisioned/initialized state), flow proceeds to block 212, whereat the provisioning system 108 retrieves the voicemail password and/or the pilot number associated with the voicemail account from the voicemail system 110. Flow then proceeds to block 214, whereat the provisioning system 108 creates a service request to instruct the OTA system 112 to format an SMS message including the voicemail password and/or the pilot number. The provisioning system 108 then delivers the service request to the OTA system 112.

As above, at block 208, the OTA system 112 receives the service request and formats the service request into an SMS message including the voicemail password and/or the pilot number. The OTA system 112 then sends the SMS message to the SMSC 114 for delivery to the mobile device 102. At block 210, the SMSC 114 receives the SMS message and forwards the message to the mobile device 102 in accordance with SMS standard protocols. The method 200 ends.

In some embodiments, the SMS message is an application-directed SMS message directed to a VVM application stored in a memory of the mobile device 102. When the mobile device 102 receives the SMS message is directs the message to the VVM application such that the VVM application is updated with the voicemail password and/or pilot number needed to access the voicemail system 110.

Figure 3:
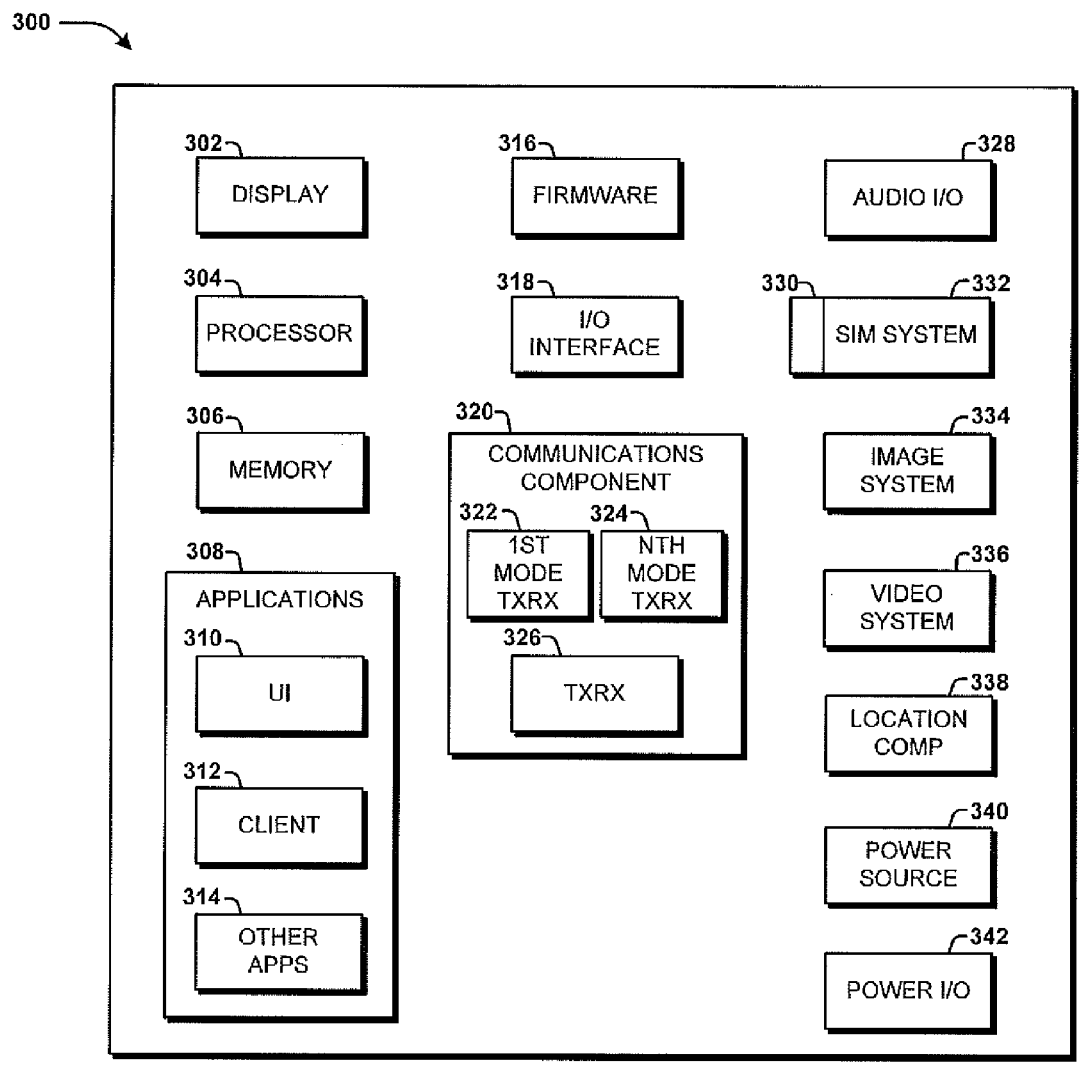
FIG. 3 illustrates an exemplary mobile device and components thereof.

Referring now to FIG. 3, a schematic block diagram of an exemplary mobile device 300 is illustrated. Although connections are not shown between the components illustrated in FIG. 3, the components can interact with each other to carry out device functions. In some embodiments, for example, the components are arranged so as to communicate via one or more busses (not shown). It should be understood that FIG. 3 and the following description are intended to provide a general understanding of a suitable environment in which the various aspects of some embodiments of the present disclosure can be implemented.

In some embodiments, the mobile device 102 illustrated in FIG. 1 is configured like the mobile device 300, now described in detail. In some embodiments, the mobile device 300 is a multimode headset and has a variety of computer readable media, including, for example, volatile media, non-volatile media, removable media, and non-removable media. The term computer-readable media and variants thereof, as used in the specification and claims, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 300.

As illustrated in FIG. 3, the mobile device 300 includes a display 302 for displaying multimedia such as, for example, application graphical user interfaces (GUIs), text, images, video, telephony functions, such as Caller ID data, setup functions, menus, voicemail message waiting identifiers (MWIs), music, metadata, messages, wallpaper, graphics, Internet content, device status, preferences settings, map and location data, profile (e.g., vibrate, silent, loud) selection, and the like. The display 302 may display visual voicemail data in visual voicemail headers. The visual voicemail headers may include the date, time, message length, message status (i.e., new-unread, read, saved, or deleted), and calling line identity (CLI) information. The illustrated mobile device 300 also includes a processor 304 for processing data and/or executing computer-executable instructions of one or more applications 308, and a memory 306 for storing data and/or one or more of the applications.

In some embodiments, the application(s) 308 include a user interface (UI) application 310. The UI application 310 interfaces with a client 312 (e.g., an operating system (OS)) to facilitate user interaction with device functionality and data. In some embodiments, the client 312 is one of Symbian OS, Microsoft® Windows® Mobile OS (available from Microsoft® Corporation of Redmond, Wash.), Palm® webOS™ (available from Palm® Corporation of Sunnyvale, Calif.), Palm® OS (available from Palm® Corporation), RIM® BlackBerry® OS (available from Research In Motion Limited of Waterloo, Ontario, Canada), Apple® iPhone® OS (available from Apple® Corporation of Cupertino, Calif.), or Google Android™ OS (available from Google™ Inc. of Mountain View, Calif.). These operating systems are merely exemplary of the operating systems that may be used in accordance with the embodiments disclosed herein.

The UI application 310 aids a user in entering message content, viewing received messages (e.g., multimedia messages, SMS messages, visual voicemail messages), managing voicemails in a visual voicemail application, answering/initiating calls, entering/deleting data, entering and setting user IDs and passwords for device access, configuring settings, manipulating address book content and/or settings, multimode interaction, interacting with other applications 314, and the like. In some embodiments, the other applications 314 include, for example, visual voicemail applications, messaging applications (e.g., SMS, EMS, MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 308 are stored in the memory 306 and/or in a firmware 316, and are executed by the processor 304. The firmware 316 may also store code for execution during device 300 power up, for example.

The illustrated mobile device 300 also includes an input/output (I/O) interface 318 for input/output of data, such as, for example, voicemail account information requests, visual voicemail management, location information, presence status information, user IDs, passwords, and application initiation (start-up) requests. In some embodiments, the I/O interface 318 is a hardwire connection, such as, for example, a USB, mini-USB, audio jack, PS2, IEEE 1394, serial, parallel, Ethernet (RJ48) port, RJ11 port, or the like. In some embodiments, the I/O interface 318 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 318 may be used for communications between the mobile device 300 and a network or local device, instead of, or in addition to, a communications component 320.

The communications component 320 interfaces with the processor 304 to facilitate wired/wireless communications with external systems. Example external systems include, but are not limited to, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 320 includes a multimode communications subsystem for providing cellular communications via different cellular technologies. In some embodiments, for example, a first cellular transceiver 322 operates in one mode, such as, GSM, and an Nth cellular transceiver 324 operates in a different mode, such as UMTS. While only two cellular transceivers 322, 324 are illustrated, it should be appreciated that a plurality of transceivers can be included.

The illustrated communications component 320 also includes an alternative communications transceiver 326 for use by other communications technologies such as, for example, WIFI, WIMAX, BLUETOOTH, infrared, infrared data association (IRDA), near field communications (NFC), RF, and the like. In some embodiments, the communications component 320 also facilitates reception from terrestrial radio networks, digital satellite radio networks, Internet-based radio services networks, combinations thereof, and the like.

The communications component 320 processes data from a network such as, for example, the Internet, an Intranet (e.g., business intranet), a home broadband network, a WIFI hotspot, and the like, via an ISP, DSL provider, or broadband provider. In some embodiments, the communications component 320 facilitates the transmission of authentication information from the mobile device 300 to a network for processing in accordance with the methods described herein.

Audio capabilities for the mobile device 300 can be provided by an audio I/O component 328 that includes a speaker for the output of audio signals and a microphone to collect audio signals.

The illustrated mobile device 300 also includes a slot interface 330 for accommodating a subscriber identity system 332 such as, for example, a subscriber identity module (SIM) card or universal SIM (USIM) card. Alternatively, the subscriber identity system 332 may be manufactured into the device 300, thereby obviating the need for a slot interface 330. In some embodiments, the subscriber identity system 332 is programmed by a manufacturer, a retailer, a user, a computer, a network operator, or the like. The subscriber identity system 332 may be configured to store voicemail account information, such as voicemail passwords and pilot numbers.

The illustrated mobile device 300 also includes an image capture and processing system 334 (image system). Photos may be obtained via an associated image capture subsystem of the image system 334, for example, a camera. The illustrated mobile device 300 also includes a video system 336 for capturing, processing, recording, modifying, and/or transmitting video content. Photos and videos obtained using the image system 334 and the video system 336, respectively, may be added as message content to an MMS message and sent to another mobile device.

The illustrated mobile device 300 also includes a location component 338 for sending and/or receiving signals such as, for example, GPS data, assisted GPS (A-GPS) data, WIFI/WIMAX and/or cellular network triangulation data, combinations thereof, and the like, for determining a location of the mobile device 300. In some embodiments, the location component 338 interfaces with cellular network nodes, telephone lines, satellites, location transmitters and/or beacons, wireless network transmitters and receivers, for example, WIFI hotspots, radio transmitters, combinations thereof, and the like. Using the location component 338, the mobile device 300 obtains, generates, and/or receives data to identify its location, or transmits data used by other devices to determine the location of the mobile device 300.

The illustrated mobile device 300 also includes a power source 340, such as batteries and/or other power subsystem (AC or DC). The power source 340 can interface with an external power system or charging equipment via a power I/O component 342.

The law does not require and it is economically prohibitive to illustrate and teach every possible embodiment of the present claims. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A system for providing voicemail account information to a mobile device comprising:
   a processor; and a non-transitory computer-readable medium having stored thereon computer-executable instructions that, when executed by the processor, cause the processor to perform operations comprising:
   determining whether a voicemail account has been initialized for a subscriber;
   if it is determined that the voicemail account has been initialized for the subscriber:
   retrieving a voicemail password and a pilot number; creating a first service request directed to an over-the-air system, the first service request instructing the over-the-air system to format a first message comprising the voicemail password and the pilot number for delivery to the mobile device via a message service center; and
   sending the first service request to the over-the-air system; and
   if it is determined that the voicemail account has not been initialized for the subscriber:
   creating a second service request directed to the over-the-air system, the second service request instructing the over-the-air system to format a second message comprising a default voicemail password and a default pilot number for delivery to the mobile device via the message service center; and sending the second service request to the over-the-air system.

2. The system of claim 1, wherein the computer-executable instructions are first computer-executable instructions and the system further comprises second computer-executable instructions that, when executed at the over-the-air system, cause the over-the-air system to perform second operations comprising:
   formatting, if the first service request is received at the over-the-air system, the first service request as the first message and sending the first message to the message service center for delivery to the mobile device and
   formatting, if the second service request is received at the over-the-air system, the second service request as the second message and sending the second message to the message service center for delivery to the mobile device.

3. The system of claim 2, further comprising third computer-executable instructions that, when executed at the message service center, cause the message service center to perform third operations comprising:
   storing, if the first message, is received from the over-the-air system, the first message and forwarding the first message to the mobile device; and
   storing, if the second message is received from the over-the-air system, the second message and forwarding the second message to the mobile device.

4. The system of claim 1, wherein the operations further comprise:
   detecting that the voicemail account has been moved from a first voicemail system to a second voicemail system;
   determining, in response to detecting that the voicemail account has been moved from the first voicemail system to the second voicemail system, whether the voicemail account has been initialized;
   retrieving, if the processor determines that the voicemail account has been initialized, the voicemail password and the pilot number from the second voicemail system, wherein at least one item, selected from a group consisting of the voicemail password and the pilot number has been changed; and
   creating, if the processor determines that the voicemail account has not been initialized, the second service request directed to the over-the-air system, the second service request instructing the over-the-air system to format the second message comprising the default voicemail password and the default pilot number, the default voicemail password and the default pilot number being assigned by the second voicemail system.

5. The system of claim 1, wherein the operations further comprise:
   detecting that the voicemail account has been moved within a voicemail system
   determining, in response to detecting that the voicemail account has been moved within the voicemail system, whether the voicemail account has been initialized
   retrieving, if the processor determines that the voicemail account has been initialized, the voicemail password and the pilot number from the voicemail system, wherein at least one item, selected from a group consisting of the voicemail password and the pilot number has been changed; and
   creating, if the processor determines that the voicemail account has not been initialized, the second service request directed to the over-the-air system, the second service request instructing the over-the-air system to format the second message comprising the default voicemail password and the default pilot number, the default voicemail password and the default pilot number being assigned by the voicemail system.

6. The system of claim 1, wherein the operations further comprise:
   detecting that a new mobile device, not previously associated with the voicemail account, has requested initialization of the voicemail account from a voicemail system;
   determining whether the voicemail account has been initialized for the new mobile device;
   if the processor determines that the voicemail account has been initialized for the new mobile device:
   retrieving the voicemail password and the pilot number from the voicemail system;
   creating the first service request directed to the over-the-air system, the first service request instructing the over-the-air system to format the first message comprising the voicemail password and the pilot number for delivery to the new mobile device via the message service center; and
   sending the first service request to the over-the-air system; and
   if the processor determines that the voicemail account has not been initialized for the new mobile device:
   creating the second service request directed to the over-the-air system, the second service request instructing the over-the-air system to format the second message comprising the default voicemail password and the default pilot number for delivery to the new mobile device via the message service center, the default voicemail password and the default pilot number being assigned by the voicemail system; and
   sending the second service request to the over-the-air-system.

7. The system of claim 1, wherein the operations further comprise:

receiving, from the mobile device, a request for the voicemail password;

determining, in response to receiving the request, whether the voicemail account has been initialized;

retrieving, if the processor determines that the voicemail account has been initialized, the voicemail password and the pilot number from a voicemail system serving the voicemail account; and creating, if the processor determines that the voicemail account has not been initialized for the new mobile device, the second service request directed to the over-the-air system, the second service request instructing the over-the-air system to format the second message comprising the default voicemail password and the default pilot number, the default voicemail password and the default pilot number being assigned by the voicemail system.

8. The system of claim 1, wherein the operations further comprise determining whether the voicemail account has been initialized for the subscriber in response to a voicemail system update that causes one item, selected from a group consisting of the pilot number and the voicemail password associated with the voicemail account, to be changed.

9. A method, for providing voicemail account information to a mobile device, comprising:

determining, by a provisioning system comprising a processor, whether a voicemail account has been initialized for a subscriber;

performing, if the voicemail account has been initialized for the subscriber, first operations comprising:

retrieving, by the provisioning system, a voicemail password from a voicemail system in which the voicemail account is stored;

creating, by the provisioning system, a first service request directed to an over-the-air system, the first service request instructing the over-the-air system to format a first message comprising the voicemail password for delivery to the mobile device via a message service center; and sending, by the provisioning system, the first service request to the over-the-air system; and performing, if the voicemail account has not been initialized for the subscriber, second operations comprising:

creating, by the provisioning system, a second service request directed to the over-the-air system to format a second message comprising a default voicemail password for delivery to the mobile device via the message service center; and sending, by the provisioning system, the second service request to the over-the-air system.

10. The method of claim 9, wherein: the first operations further comprise:

retrieving a pilot number from the voicemail system; and creating the first service request directed to the over-the-air system, the first service request instructing the over-the-air system to format the first message further comprising the pilot number for delivery to the mobile device via the message service center; and the second operations further comprise creating the second service request directed to the over-the-air system, the second service request instructing the over-the-air system to format the second message further comprising the default pilot number for delivery to the mobile device via the message service center.

11. The method of claim 9, further comprising:

formatting, by the over-the-air system, if the first service request is received, from the provisioning system, at the over-the-air system, the first service request as the first message and sending the first message to the message service center for delivery to the mobile device; and formatting, by the over-the-air system, if, the second service request is received, from the provisioning system, at the over-the-air system, the second service request as the second message and sending the second message to the message service center for delivery to the mobile device.

12. The method of claim 11, further comprising:

storing, by the message service center, if the first message is received at the message service center from the over-the-air system, the first message and forwarding the first message to the mobile device; and storing, by the message service center, if the second message is received at the message service center from the over-the-air system, storing the second message and forwarding the second message to the mobile device.

13. The method of claim 9, further comprising:

detecting, by the provisioning system, that the voicemail account has been moved from a first voicemail system to a second voicemail system;

determining, by the provisioning system, whether the voicemail account has been initialized for the subscriber in response to the move;

retrieving, by the provisioning system, if the voicemail account has been initialized, the voicemail password from the second voicemail system;

creating, by the provisioning system, if the voicemail account has not been initialized, the second service request directed to the over-the-air system, the second service request instructing the over-the-air system to format the second message comprising the default voicemail password, the default voicemail password being assigned by the second voicemail system.

14. The method of claim 13, further comprising:

retrieving, by the provisioning system, if the voicemail account has been initialized, a pilot number from the second voicemail system;

creating, by the provisioning system, if the voicemail account has not been initialized, the second service request directed to the over-the-air system, the second service request instructing the over-the-air system to format the second message further comprising a default pilot number, the default pilot number being assigned by the second voicemail system.

15. The method of claim 9, further comprising:

detecting, by the provisioning system, that the voicemail account has been moved within a voicemail system;

determining, by the provisioning system, whether the voicemail account has been initialized for the subscriber in response to the move;

retrieving, by the provisioning system, if the voicemail account has been initialized, the voicemail password and a pilot number from the voicemail system, wherein at least one item, selected from a group consisting of the voicemail password and the pilot number, has been changed;

creating, by the provisioning system, if the voicemail account has not been initialized, the second service request directed to the over-the-air system, the second service request instructing the over-the-air system to format the second message comprising the default voicemail password and a default pilot number, the default voicemail password and the default pilot number being assigned by the voicemail system.

16. The method of claim 9, further comprising:
- detecting, by the provisioning system, that a new mobile device, not previously associated with the voicemail account, has requested initialization of the voicemail account from a voicemail system;
- determining, by the provisioning system, whether the voicemail account has been initialized for the new mobile device;
- performing, by the provisioning system, if the voicemail account has been initialized for the new mobile device, third operations comprising:
- retrieving the voicemail password and a pilot number from the voicemail system, wherein at least one item, selected from a group consisting of the voicemail password and the pilot number, has been changed;
- creating the first service request directed to the over-the-air system, the first service request instructing the over-the-air system to format the first message comprising the voicemail password and the pilot number for delivery to the new mobile device via the message service center; and
- sending the first service request to the over-the-air system; and
- performing, by the provisioning system, if the voicemail account has not been initialized for the new mobile device, fourth operations comprising;
- creating the second service request directed to the over-the-air system, the second service request instructing the over-the-air system to format the second message further comprising a default pilot number, the default voicemail password and the default pilot number being assigned by the voicemail system; and
- sending the second service request to the over-the-air-system.

17. The method of claim 9, further comprising:
- receiving, by the provisioning system, from the mobile device, a request for the voicemail password;
- determining, by the provisioning system, in response to receiving the request for the voicemail password, whether the voicemail account has been initialized;
- retrieving, by, the provisioning system, if the voicemail account has been initialized, the voicemail password from a voicemail system serving the voicemail account; and
- creating, by the provisioning system, if the voicemail account has not been initialized, the second service request directed to the over-the-air system, the second service request instructing the over-the-air system to format the second message comprising the default voicemail password, the default voicemail password being assigned by the voicemail system.

18. The method of claim 17, further comprising:
- retrieving, by the provisioning system, if the voicemail account has been initialized, a pilot number from the voicemail system serving the voicemail account; and
- creating, by the provisioning system, if the voicemail account has not been initialized, the second service request directed to the over-the-air system, the second service request instructing the over-the-air system to format the second message further comprising a default pilot number, the default pilot number being assigned by the voicemail system.

19. The method of claim 9, further comprising
- determining, by the provisioning system, whether the voicemail account has been initialized for the subscriber in response to a voicemail system update that causes at least one item, selected from a group consisting of the voicemail password and a pilot number associated with the voicemail account, to be changed.

20. A non-transitory computer-readable storage medium comprising computer-executable instructions that, when executed by a processor, cause the processor to perform operations comprising:
- determining whether a voicemail account has been initialized for a subscriber;
- if the processor determines that the voicemail account has been initialized for the subscriber:
  - retrieving a voicemail password and a pilot number;
  - creating a first service request directed to an over-the-air system, the first service request instructing the over-the-air system to format a first message comprising the voicemail password and the pilot number for delivery to the mobile device via a message service center; and
  - sending the first service request to the over-the-air system; and
- if the processor determines that the voicemail account has not been initialized for the subscriber:
  - creating a second service request directed to the over-the-air system, the second service request instructing the over-the-air system to format a second message comprising a default voicemail password and a default pilot number for delivery to the mobile device via the message service center; and
  - sending the second service request to the over-the-air system.

* * * * *